United States Patent [19]

Carman

[11] Patent Number: 4,770,388
[45] Date of Patent: Sep. 13, 1988

[54] LATCHED VALVE HANDLE

[75] Inventor: Claude R. Carman, Troy, Pa.

[73] Assignee: E. I. Du Pont de Nemours and Company, Wilmington, Del.

[21] Appl. No.: 857,312

[22] Filed: Apr. 30, 1986

[51] Int. Cl.⁴ ........................ F16K 35/00; F16K 35/02
[52] U.S. Cl. .......................................... 251/95; 74/526; 251/104; 251/110; 251/288; 403/117
[58] Field of Search ........................ 74/526, 545, 543; 137/385; 251/95, 98, 101, 102, 104, 110, 288, 315, 316, 317; 292/108, 153, 210; 403/113, 117; 16/110 R

[56] References Cited

U.S. PATENT DOCUMENTS

| | | | |
|---|---|---|---|
| 557,943 | 4/1896 | Bayley et al. | 251/110 |
| 766,324 | 8/1904 | Campbell | 251/104 |
| 934,099 | 9/1909 | Sheafe | 251/104 |
| 1,797,282 | 3/1931 | Bentley | 251/104 |
| 3,228,415 | 1/1966 | Geiss | 251/101 |
| 3,355,141 | 11/1967 | Cooper | 251/101 |
| 4,126,023 | 11/1978 | Smith et al. | 251/101 |
| 4,203,572 | 5/1980 | Coffman | 251/95 |
| 4,570,901 | 2/1986 | Holtgraver | 251/98 |

FOREIGN PATENT DOCUMENTS 254542  11/1926  Italy ...................................... 251/104

Primary Examiner—George L. Walton

[57] ABSTRACT

A latching device for the actuator in a valve installation. The actuator includes a handle for rotating a valve stem and a latch slidably mounted on the handle. The latch has one edge which abuts a stop when in the closed position and an opposed, angularly disposed, camming edge facing a stop at the open position.

3 Claims, 2 Drawing Sheets

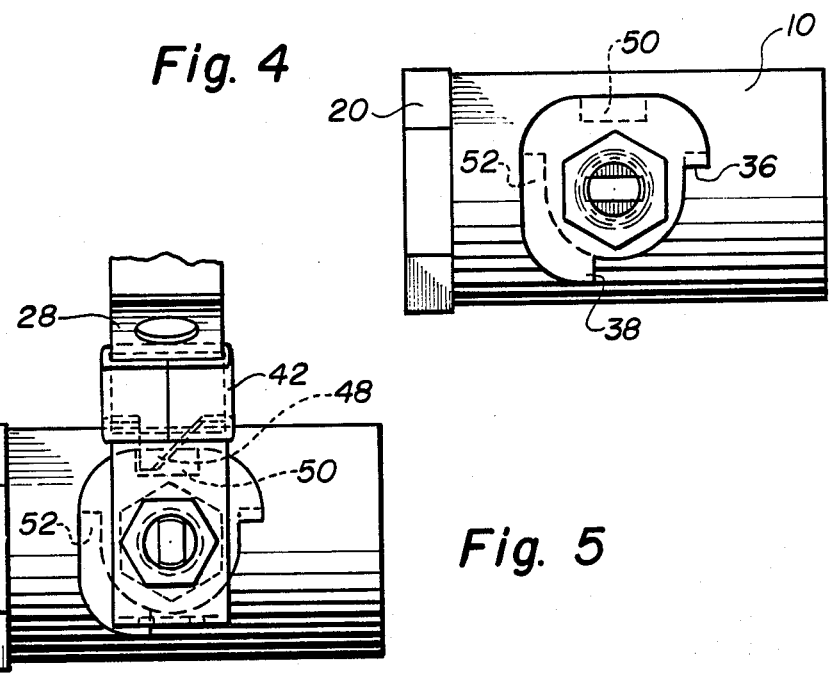
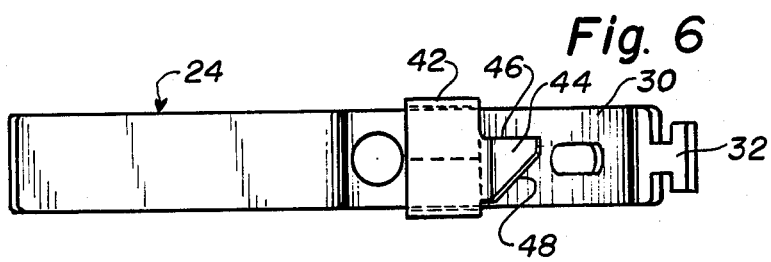
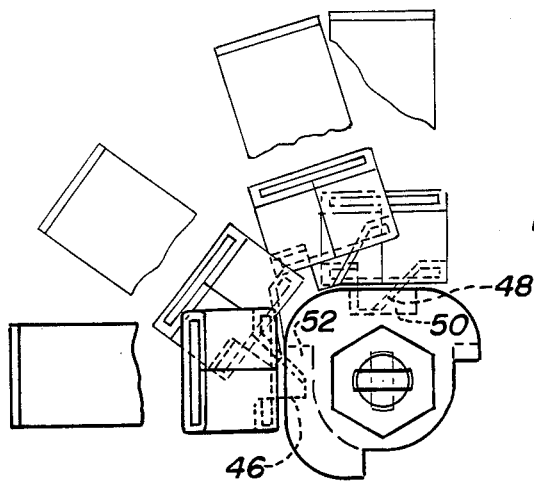

LATCHED VALVE HANDLE

BACKGROUND

This invention relates generally to valve installations and, more particularly, to valves having manual actuators or handles.

It is known in the art that accidental actuation of such valves can be prevented by providing releasable latches for holding the handles in the open and closed positions. Those precautions are desirable in many installations but there are others in which positive latching in the open position is foreclosed by safety considerations.

SUMMARY

According to the present invention, an installation of the type which includes a valve body having exterior recesses presenting stops corresponding to open and closed positions, a pivoted actuating handle and a latch slidably mounted on the handle for movement into and from the recesses is improved by providing an angularly disposed edge on the latch. That edge faces the stop corresponding to the open position and cams the slideable latch over the stop as the handle is pivoted toward the closed position.

DRAWINGS

FIGS. 3 and 4 are top views of the valve in its open position, the handle having been omitted in FIG. 4.

FIG. 5 is a top view of the valve in its closed position.

FIG. 6 is a bottom view of the actuator shown in FIGS. 1-3 and 5.

FIG. 7 is a fragmentary, schematic illustration showing the actuator of FIG. 6 in the open, closed and intermediate positions.

DESCRIPTION

Figure 1:
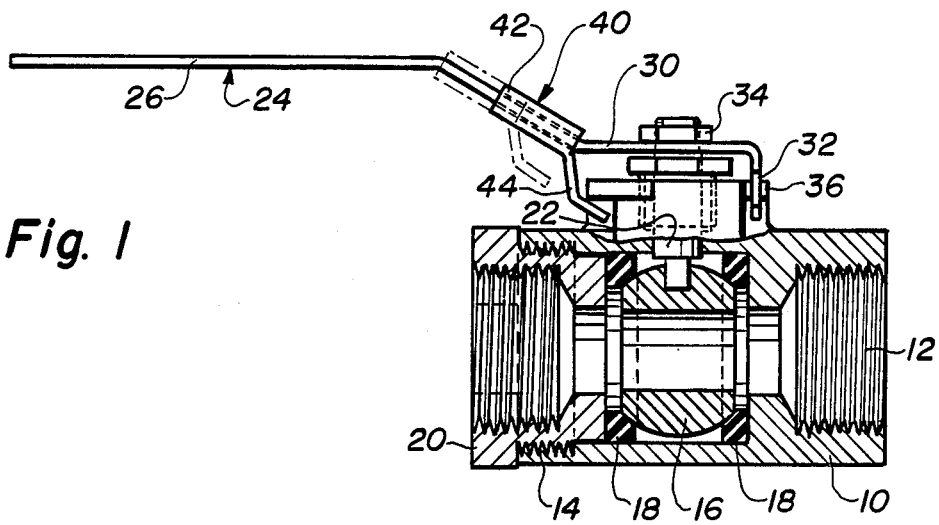
FIG. 1 is an elevational view of a ball valve incorporating the improvement of the present invention. The body has been broken away to show the ball in its open position.

The valve installation chosen for purposes of illustration includes a body 10 having opposed, threaded openings 12,14. After placement of a ball 16 and seats 18, an adapter 20 is screwed into opening 14. Ball 16 is keyed to a stem 22 which, in turn, is keyed to an actuator 24.

Figure 2:
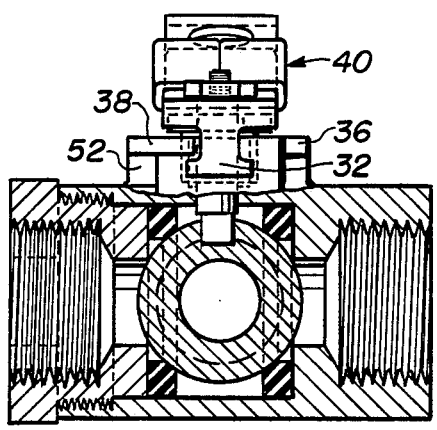
FIG. 2 is a similar view, except that the ball is shown in its closed position.
Figure 3:
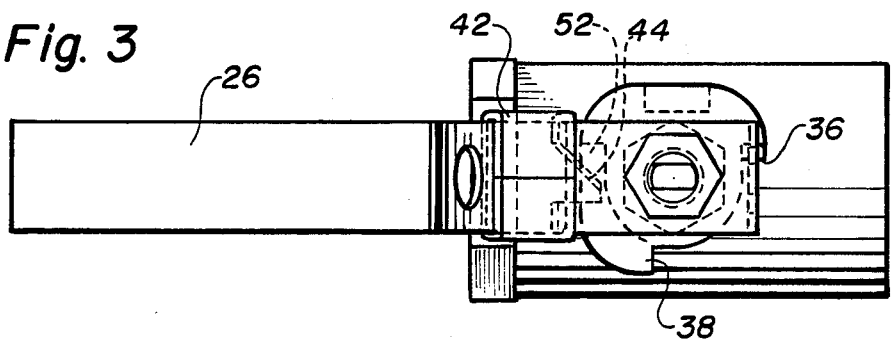

Actuator 24 is fabricated from a strip of sheet metal bent to form a handle 26, an angularly disposed ramp 28, an actuating plate 30 and a lateral tee 32. Plate 30 is slotted to receive a threaded key on the outer end of stem 22. Actuator 24 is held in place by a nut 34. When ball 16 is in the open position, as shown in FIGS. 1 and 3, tee 32 engages a stop 36 on body 10. In the closed position (FIGS. 2 and 5), tee 32 engages a stop 38 and actuator 24 is held against swinging movement toward the open position by a latching device 40.

Device 40 includes a slide 42 on ramp 28 and an integral tab 44. As best shown in FIGS. 5-7, tab 44 is flat and has a first edge 46 which is aligned with the swing arm of actuator 24 and with the direction of sliding movement of device 40 on ramp 28. Tab 44 has a second edge 48 which is angularly disposed with respect to the edge 46. When the valve reaches its closed position, tab 44 falls into a recess 50 in valve body 10. An end of the recess presents a stop for the first edge 46 of tab 44 and thus prevents swinging movement of the handle 26 toward the open position until the slide is pushed up ramp 28. Once tab 44 is out of the recess 50, handle 26 can be swung to the open position of the valve where the tab slides into a recess 52 and tee 32 engages stop 36. Since the second edge 48 is angularly disposed, it cams the tab outwardly when the handle is next swung to the closed position, i.e., there is no need to move slide 42 manually up ramp 28 before swinging actuator 24 to the closed position.

What is claimed as new and desired to be secured by Letters Patent is:

1. In a valve installation including a valve body and a valve element, said valve body having at least a pair of exterior recesses presenting stops thereon corresponding to open and closed positions of said valve element, a pivoted actuating handle and a latch slidably mounted on the handle for movement into and from the recesses, said latch being manually slidably upwardly on the actuating handle out of actuating handle out of one of said recesses corresponding to said closed position so that the handle can be pivoted toward to open position, wherein when said handle reaches the open position said latch can be slidably moved down the handle into the other one of said recesses for holding the valve element in the open position, the improvement comprising provision of an angularly disposed edge on the latch, facing the stop corresponding to the open position, for automatically camming the latch over that stop as the handle is pivoted toward the closed position.

2. The valve installation of claim 1 wherein said latch is a tab having opposed edges, one being said angularly disposed edge, the other being an edge aligned with its direction of movement into and from the recesses, said edge being thereby adapted to abut the stop corresponding to the closed position.

3. A valve installation including a body having a passage therethrough, a movable element in the passage, a rotatable stem extending from the element through the body, a pivoted handle for rotating the stem, and a latch slidably mounted on the handle for movement into and from at least a pair of recesses and having stops defined by said recesses on the body corresponding to open and closed positions of said movable element, said latch being manually slidably upwardly on the handle out of one of said recesses corresponding to said closed positions so that the handle can be pivoted toward the open position, wherein when said handle reaches the open position said latch can be slidably moved down the handle into the other one of said recesses for holding the movable element in the open position, the improvement comprising said latch having a first edge for latching engagement with one of said stops in the closed position and an opposed, angularly disposed edge for automatically camming the latch over the other one of said stops as the handle is pivoted toward the closed position.

* * * * *